United States Patent [19]
Diethelm

[11] Patent Number: 5,840,437
[45] Date of Patent: Nov. 24, 1998

[54] APPARATUS WITH FUEL CELLS

[75] Inventor: Roland Diethelm, Bauma, Switzerland

[73] Assignee: Sulzer Innotec AG, Winterthur, Switzerland

[21] Appl. No.: 756,618

[22] Filed: Nov. 26, 1996

[30] Foreign Application Priority Data

Dec. 19, 1995 [EP] European Pat. Off. ............... 95810806

[51] Int. Cl.⁶ .............................. H01M 8/04; H01M 8/06; H01M 8/18
[52] U.S. Cl. ................................ 429/14; 429/20; 429/17; 429/26
[58] Field of Search ................................ 429/13, 14, 17, 429/20, 18, 26

[56] References Cited

U.S. PATENT DOCUMENTS

| | | | |
|---|---|---|---|
| 3,146,131 | 8/1964 | Linden et al. | 136/86 |
| 3,718,506 | 2/1973 | Fischer | 136/86 C |
| 5,047,299 | 9/1991 | Shockling | 429/20 |
| 5,143,800 | 9/1992 | George et al. | 429/20 |
| 5,169,730 | 12/1992 | Reichner et al. | 429/20 |
| 5,492,777 | 2/1996 | Isenberg et al. | 429/17 |
| 5,498,487 | 3/1996 | Ruka et al. | 429/20 |
| 5,601,937 | 2/1997 | Isenberg | 429/17 |

FOREIGN PATENT DOCUMENTS

| | | |
|---|---|---|
| 0377151 | 7/1990 | European Pat. Off. . |
| 0654838A1 | 5/1995 | European Pat. Off. . |
| 0668622A1 | 8/1995 | European Pat. Off. . |
| 4217892A1 | 12/1992 | Germany . |
| WP 94/18712 | 8/1994 | WIPO . |

OTHER PUBLICATIONS

Patent Abstracts of Japan, vol. 12, No. 153 (E–607), May 11, 1988 & JP–A–62 268066 (Mitsubishi Heavy Ind. Ltd.) Nov. 20, 1987, Abstract.

Primary Examiner—Kathryn L. Gorgos
Assistant Examiner—Chrisman D. Carroll
Attorney, Agent, or Firm—Townsend and Townsend and Crew LLP

[57] ABSTRACT

The apparatus comprises a cell block with fuel cells, a heat insulating sleeve and an afterburner chamber between the sleeve and the cell block. The afterburner chamber is connected at two opposite ends via channels to at least one exhaust outlet for exhaust gases. These channels are each closeable by a blocking member, with the combustion chamber of the auxiliary burner communicating with the channel between the afterburner chamber and one of the blocking members. This blocking member is closed during a starting-up phase, while the other blocking member is open.

11 Claims, 2 Drawing Sheets

APPARATUS WITH FUEL CELLS

BACKGROUND OF THE INVENTION

The invention relates to an apparatus with fuel cells as well as to a method for starting up the operation of the apparatus.

A prereformer is integrated into such an apparatus known from EP-A 0654 838. The auxiliary burner is used, on the one hand, to heat up the prereformer during a start-up phase and, on the other hand, to preheat infed air in a channel system of the sleeve. Heat is supplied to the cell block by the preheated air. This supply of heat is not sufficient to heat the fuel cells to a minimum operating temperature of 850° C. Therefore it is necessary to feed combustible gas and air into the apparatus and burn them in the afterburner chamber between the cell block and the sleeve. Immediately after the start of the combustion, which must be ignited, large temperature gradients arise, which can lead to damage to the cells.

SUMMARY OF THE INVENTION

It is the object of the invention to provide an apparatus with fuel cells in which the warm-up phase can be performed without damage to the cells.

The apparatus comprises a cell block with fuel cells, a heat insulating sleeve and an afterburner chamber between the sleeve and the cell block. The afterburner chamber is connected in accordance with the invention at opposite ends via two channels to at least one flue or exhaust element for exhaust gases. These channels are each closeable by a blocking member, with the combustion chamber of an auxiliary burner communicating with the channel between the afterburner chamber and one of the blocking members. This blocking member is closed during the warm-up phase, whereas the other is open. During a transition to the normal operating state the blocking members are switched in reverse, i.e. the open one is closed and the closed one opened.

During the warm-up phase the exhaust gas of the auxiliary burner flows into the afterburner chamber and there heats up the cell block; at the same time the sleeve of the apparatus is also heated up. Before the exhaust gas is conducted to the afterburner chamber, it can be passed through a heat exchanger, by means of which a prereformer can be heated up.

Air and gas are already fed in in smaller amounts (5 to 10% in comparison to the operating state delivering power) during or shortly after the start-up phase in order to produce and maintain the correct air and gas distribution respectively within the fuel cells for the operating state. After flowing through the cells the air and the gas exit into the afterburner chamber. As soon as the temperature there reaches about 700° C. a spontaneous combustion of the gas fed in takes place.

The temperature in the sleeve can be kept under control by controlling or regulating the amount of air fed in. When the operating temperature is reached the mass flows of the air and the gas are increased to the optimum values for carrying out the electrochemical reaction.

When the blocking members are switched in reverse after the operating temperature (900° C.) is attained in the cell block, there is a reversal of the flow in the combustion chamber. The afterburned exhaust gases of the fuel cells now enter into the heat exchanger of the prereformer, if such is present. In the prereformer natural gas and water are partially converted catalytically and endothermically to hydrogen, carbon monoxide and carbon dioxide. Non-converted natural gas is subsequently further reformed at the electrodes of the fuel cells.

After giving heat off to the prereformer the still hot exhaust gas can for example be used for the heating of utility water. If the heat required for the utility water is greater than can be recovered by that available from the electrochemical reaction, additional heat can be supplied by the auxiliary burner. Here the exhaust gas of the auxiliary burner is mixed with the exhaust gas of the fuel cells and can thus be fed to a heat exchanger provided for the water heating without having to pass through the afterburner chamber beforehand. This additional heat requirement can take on a maximum value amounting to about five times the heat given off by the cells.

DESCRIPTION OF THE PREFERRED EMBODIMENTS

Figure 1:
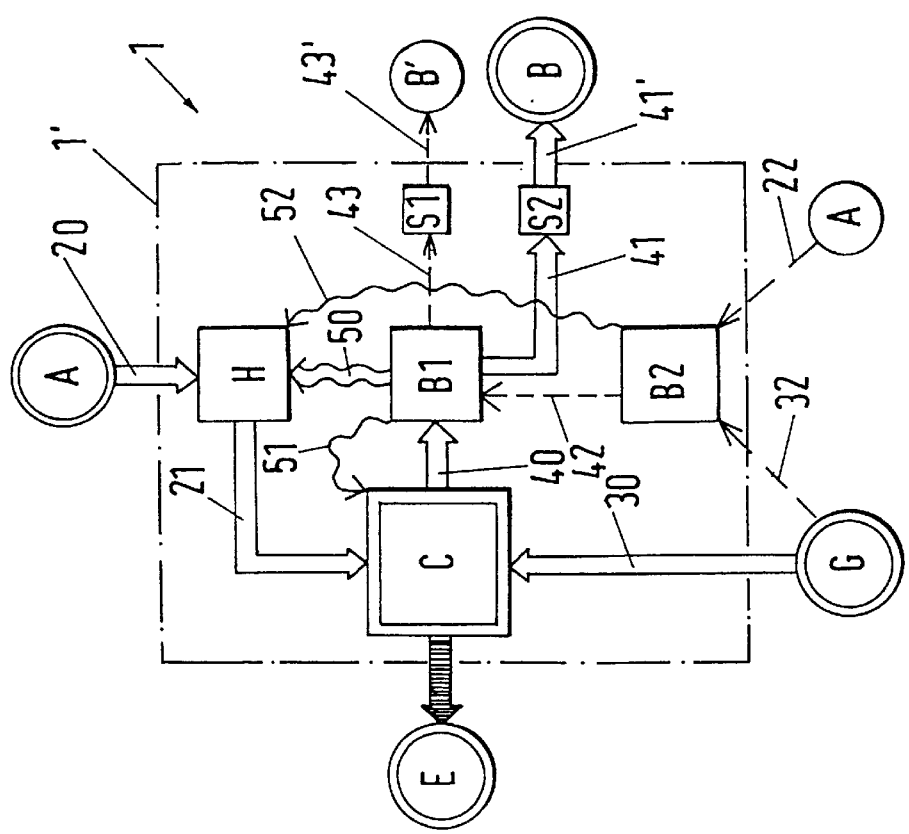
FIG. 1 is a block diagram with the most important components of an apparatus in accordance with the invention.

The blocks of FIG. 1 which are located within the chain—dotted frame 1' represent the components of an apparatus in accordance with the invention. Their meanings are as follows: C=cell block in which electrical energy E is produced from gas G and air A; H =sleeve which contains a channel system formed as a preheater for the supplied air A; B1=afterburner chamber between the cell block C and the sleeve H; B2 =auxiliary burner in which a mixture of gas G and air A is burned; S1 =first outlet or blocking member through which the exhaust gas B' leaves the apparatus 1 during the warm-up phase; S2=second outlet or blocking member through which exhaust gas B departs into a flue (not shown) during the power delivering operating state.

The arrows 20 and 21 indicate the transport of air, arrow 30 and 40 indicate the transport of gas, and arrows 41 and 41' indicate the transport of exhaust gas during the power delivering operation (S1 closed, S2 open). The heat flowing out of the combustion chamber B1 into the sleeve, which is utilized for a preheating of the air A, is represented by the arrow 50. The arrows 22, 32, 42, 43, 43', 51 and 52 refer to the starting-up phase (S1 open, S2 closed). Here the arrow 51 is the heat flow from the exhaust gas B' of the auxiliary burner B2, which flows through the afterburner chamber B1 (arrows 42, 43). Heat from the auxiliary burner B2, which is used for preheating the air A in the sleeve H, is represented by the arrow 52.

Figure 2:
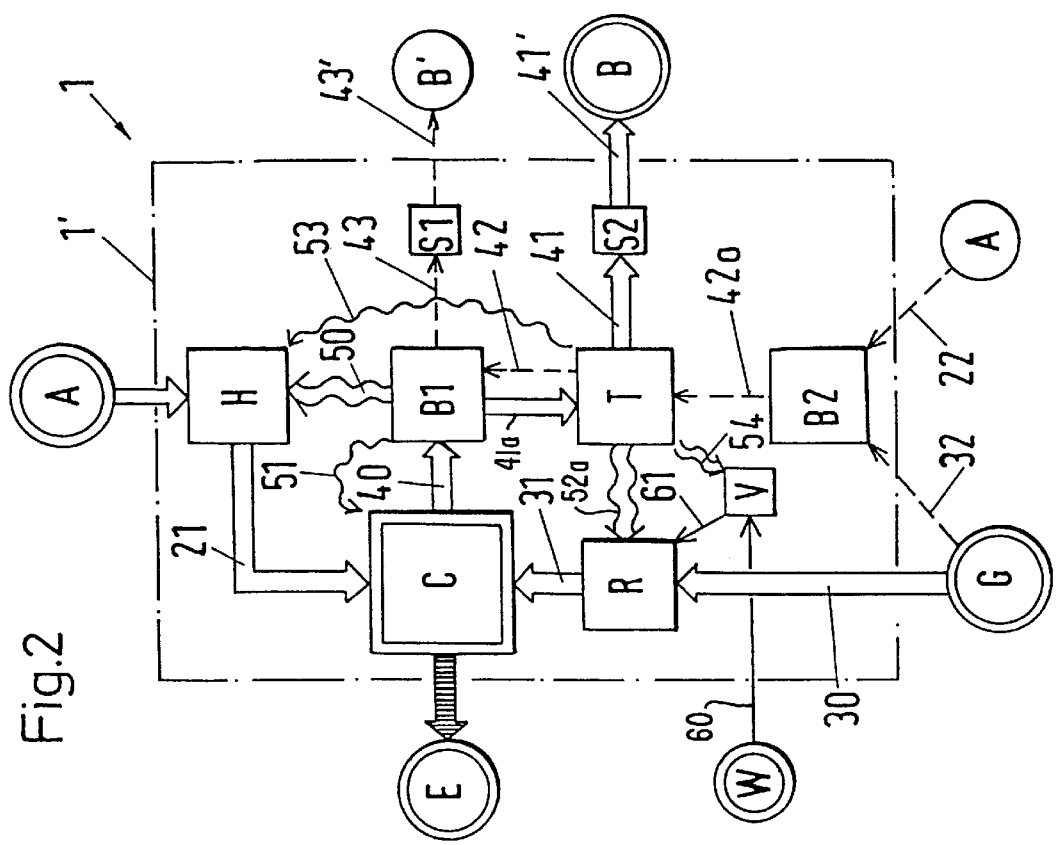
FIG. 2 is a block diagram of an apparatus in accordance with the invention containing a prereformer.

The block diagram of FIG. 2, which is an expansion of the first-block diagram, represents an apparatus 1 with a prereformer R. During the operating state the exhaust gas B (arrow 41a) of the afterburner chamber B1 flows through a heat exchanger T, via which a heat infeed (arrow 52a) into the prereformer R takes place. At the same time a vaporizer V is heated (arrow 54) in which water W (arrow 60) is vaporized. A vapor reforming procedure is carried out with the vapor (arrow 61) and the gas G (arrow 30) in the prereformer R. During the warm-up phase the prereformer R is likewise heated up to operating temperature via the heat exchanger T by means of exhaust gases B' from the auxiliary burner B2 (arrow 42a). The air A fed into the apparatus 1 is preheated by means of a heat flow from T to H (arrow 53).

Figure 3:
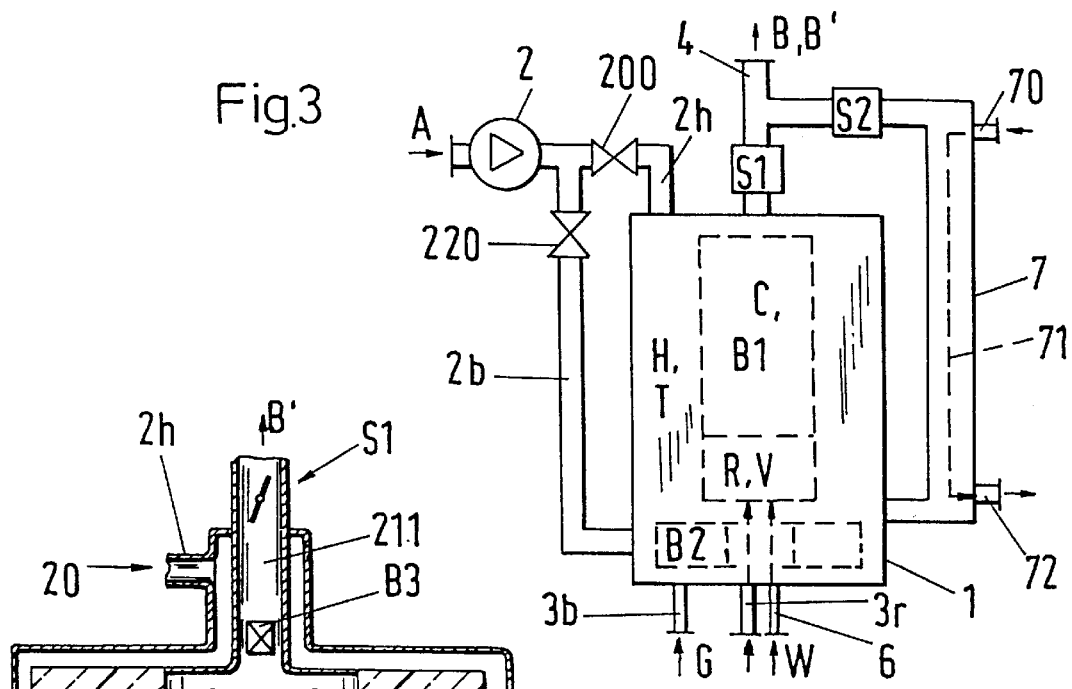
FIG. 3 is a schematic drawing of a plant comprising the apparatus in accordance with the invention.

FIG. 3 is a schematic drawing of a plant comprising an apparatus 1 in accordance with the invention, a blower 2 for the air A, a flue or exhaust element 4 for the exhaust gases B and B', as well as a heat exchanger for removing heat from the exhaust gas flow. Air A is fed, on the one hand, into the sleeve H of the apparatus 1 via a valve 200 and a supply line 2h. On the other hand air A is fed into the auxiliary burner B2 via a valve 220 and a supply line 2b (B2 is executed in ring form). Gas G is supplied via the lines 3r and 3b into the prereformer R and the auxiliary burner B2 respectively. Water W is supplied to the vaporizer V via a line 6. The exhaust gases B and/or B' from the afterburner chamber B1 and auxiliary burner B2 respectively are—before they enter into the flue 4—passed through the heat exchanger 7, by means of which for example utility water is heated (via connections 70, 72 and heat exchanger tube 71).

Figure 4:
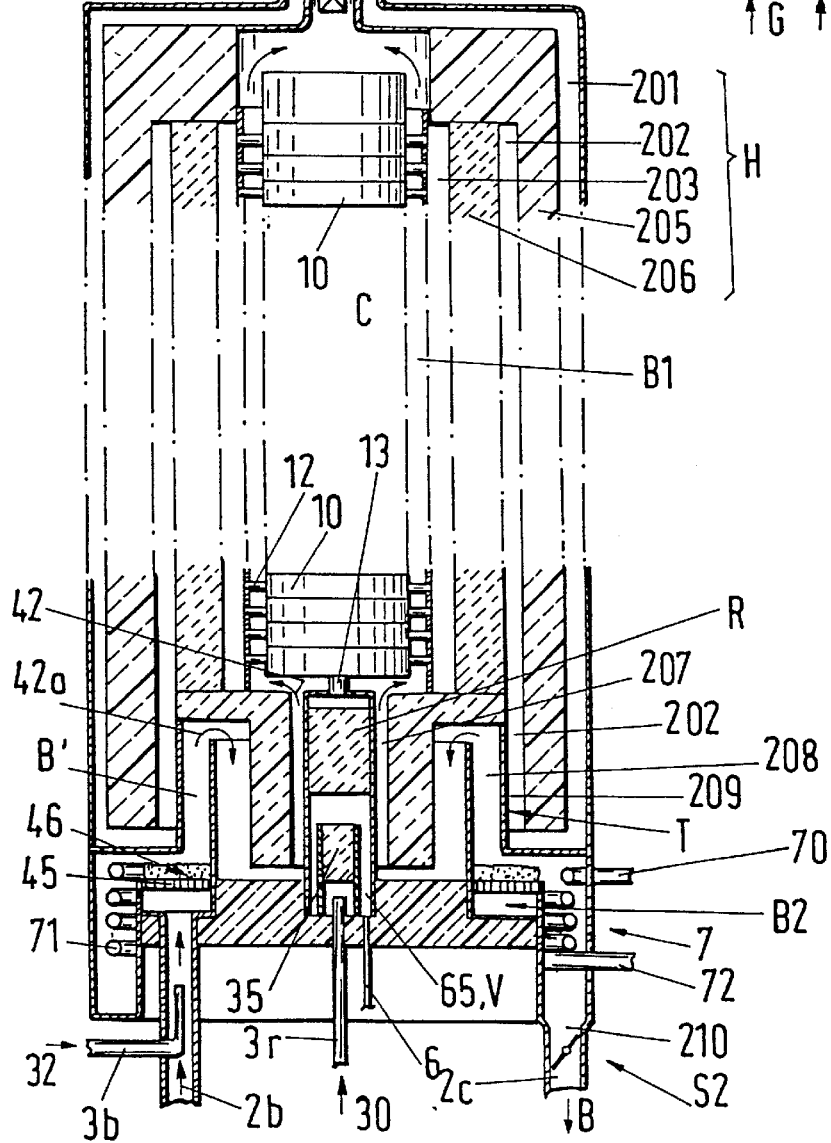
FIG. 4 is a sectional view illustrating an advantageous exemplary embodiment of the invention.

FIG. 4 shows an exemplary embodiment of the apparatus 1 in accordance with the invention whose cell block C consists of a stack of substantially centrally symmetrical high temperature fuel cells 10 (cf. the initially cited EP-A 0654 838).

The blocking members S1 and S2 are executed as flaps. They are placed in the channels 211 and 210 which connect the apparatus 1 to a non-illustrated exhaust gas flue (flue 4 in FIG. 3).

The sleeve H comprises a channel system with annular gap spaces 201, 202 as well as 203, an airtight body 205 of a heat restraining material, and a body permeable to air 206 which permits a uniform radial air flow from the space 202 into the space 203. The air is fed from the space 203 via tubelets 12 through the afterburner chamber B1 into the cells 10.

The lower part of the sleeve H comprises a prereformer R, an auxiliary burner B2, a heat exchanger T and a utility water heater 7. The auxiliary burner B2 is executed in ring form. A gas/air mixture (supply lines 3b, 2b) is brought to combustion on a plate 45 with uniformly distributed passage openings, to from with an areally extending flame in the combustion chamber 46. During the warm-up operation (S1 open, S2 closed) the prereformer R is heated with the hot exhaust gases of the auxiliary burner B2 (arrow 42a) in the exhaust gas channel 207. A heating up of the air flowing in the sleeve H results via a heat conducting wall 209 between the air channel 202 and an exhaust gas channel 208 of the auxiliary burner B2.

The gas G required for the power yielding reaction is fed centrally into the cell stack C from the prereformer R via a line 13. A sulphur absorber 35 by means of which impurities of the natural gas containing sulphur can be removed is placed ahead of the prereformer R. The gas G (arrow 30) is fed into the sulphur absorber 35 via the line 3r.

A jacket space 65 in the form of a ring gap about the sulphur absorber 35 is provided as a vaporizer V for water (infeed line 6). As a result of the evaporation there is a cooling down and, therefore the temperatures in the sulphur absorber 35 take on lower values than in the prereformer R and thereby make the absorption processes possible in the first place.

After the transport through the power supplying fuel cells 10 a combustible residue still remains in the gas G, which is burned in the afterburner chamber B1. During the warm-up phase no combustion occurs in the chamber B1—as long as no spontaneous combustion occurs. In order to prevent unburned substances from escaping through the open outlet S1, a flare-off burner B3 can be placed ahead of the outlet S1. This burner B3 must be ignited, for instance with a glowing wire.

The apparatus 1 of FIG. 4 is especially suitable for household applications. On the one hand a constant electric power can be produced. On the other hand a supply of heat energy lying in a broad range can be made available through the use of the auxiliary burner B2. Employing the method in accordance with the invention, the temperature of the cell stack remains uninfluenced by the variable heating power.

What is claimed is:

1. Apparatus comprising a cell block having fuel cells, a heat insulating sleeve substantially surrounding the cell block, an afterburner chamber between the sleeve and the cell block, and an auxiliary burner having a combustion chamber, the afterburner chamber having opposite ends respectively connected via first and second channels to at least one exhaust duct, the first and second channels each being closeable by a first blocking member and a second blocking member respectively, the combustion chamber of the auxiliary burner communicating with the second channel at a location between the afterburner chamber and the second blocking member, the second blocking member being closed and the first blocking member being open during a starting-up phase.

2. Apparatus in accordance with claim 1 further comprising a prereformer provided in the sleeve for the processing of a gas and a heat exchanger which is connected to the prereformer and comprises a channel for the heating of the auxiliary burner or cell block by exhaust gas from the exhaust duct.

3. Apparatus in accordance with claim 2 further comprising a vaporizer for water and an exhaust gas channel which is connected to the vaporizer via a heat transferring wall.

4. Apparatus in accordance with claim 2 further comprising a sulphur absorber placed upstream of the prereformer.

5. Apparatus in accordance with claim 1, wherein the sleeve further comprises a channel system having an inlet for receiving air and an outlet connected to the cell block for the preheating of air and further comprising heat transferring walls placed between the channel system and an exhaust gas channel of the auxiliary burner.

6. Apparatus in accordance with claim 1, further comprising a heat exchanger provided upstream of the second blocking member for the removal of heat from the exhaust gases.

7. Apparatus in accordance with claim 1, wherein the cell block includes a stack of substantially centrally symmetric cells.

8. Method for operating an apparatus in accordance with claim 1 comprising the step of supplying sufficient heat by means of the auxiliary burner to produce exhaust gases of sufficient temperature to meet additional heating requirement, with this additional heating requirement having maximum values amounting to about five times the heat delivered by the cells.

9. Method for starting up an apparatus comprising a cell block having fuel cells, a heat insulating sleeve substantially surrounding the cell block, an afterburner chamber between the sleeve and the cell block, and an auxiliary burner having a combustion chamber, the afterburner chamber having opposite ends respectively connected via first and second channels to at least one exhaust duct, the first and second channels each being closeable by a first blocking member and a second blocking member respectively. the combustion chamber of the auxiliary burner communicating with the second channel at a location between the afterburner chamber and the second blocking member, the method comprising the steps of (a) supplying reaction materials into the cell block at an initial mass flow rate, (b) closing the second blocking member and opening the first blocking member, (c) activating and heating up the auxiliary burner with exhaust gases of the cell block via the afterburner chamber until a preset required temperature for operation of the fuel cells is attained, (d) thereafter opening the second blocking member, closing the first blocking member and switching off the auxiliary burner, and (e) thereafter adjusting the mass flows of the reaction materials supplied into the cell block to optimize stationary operation of the cells.

10. Method in accordance with claim 9 wherein the step of adjusting includes reducing the mass flow rate of the reaction materials to 5 to 10% of the initial mass flow rate.

11. Method in accordance with claim 10 further comprising the step of carrying out afterburning at the first blocking member.

* * * * *